United States Patent

Drager et al.

Patent Number: 5,867,004
Date of Patent: *Feb. 2, 1999

[54] RELATIVE ANGEL ESTIMATION APPARATUS FOR A SENSORLESS SWITCHED RELUCTANCE MACHINE SYSTEM

[75] Inventors: Barry T. Drager, Rockford; Stephen R. Jones, Winnebago; Graham T. Fordyce, Rockford, all of Ill.

[73] Assignee: Sundstrand Corporation, Rockford, Ill.

[*] Notice: This patent issued on a continued prosecution application filed under 37 CFR 1.53(d), and is subject to the twenty year patent term provisions of 35 U.S.C. 154(a)(2).

[21] Appl. No.: 629,665

[22] Filed: Apr. 9, 1996

[51] Int. Cl.$^6$ .................................................. H02P 6/12
[52] U.S. Cl. ........................................... 318/701; 318/254
[58] Field of Search ................................. 318/700, 701, 318/720–724, 685, 696, 254, 439

[56] References Cited

U.S. PATENT DOCUMENTS

| | | | |
|---|---|---|---|
| 4,331,924 | 5/1982 | Elliott et al. | 377/47 |
| 4,374,351 | 2/1983 | Fishman et al. | 318/600 |
| 4,553,078 | 11/1985 | Wise | 318/594 |
| 4,611,157 | 9/1986 | Miller et al. | 318/696 |
| 4,642,543 | 2/1987 | MacMinn | 318/696 |
| 4,772,839 | 9/1988 | MacMinn et al. | 318/696 |
| 4,959,596 | 9/1990 | MacMinn et al. | 318/254 |
| 4,959,823 | 9/1990 | Getreuer et al. | 369/44.13 |
| 5,007,401 | 4/1991 | van Zanten et al. | 364/574 |
| 5,097,190 | 3/1992 | Lyons et al. | 318/701 |
| 5,107,195 | 4/1992 | Lyons et al. | 318/701 |
| 5,140,243 | 8/1992 | Lyons et al. | 318/701 |
| 5,140,244 | 8/1992 | Lyons et al. | 318/701 |
| 5,144,564 | 9/1992 | Naidu et al. | 364/494 |
| 5,165,051 | 11/1992 | Kumar | 324/79 |
| 5,173,650 | 12/1992 | Hedlund | 318/701 |
| 5,196,775 | 3/1993 | Harris et al. | 318/638 |
| 5,291,115 | 3/1994 | Ehsani | 318/701 |
| 5,296,785 | 3/1994 | Miller | 318/254 |
| 5,296,794 | 3/1994 | Lang et al. | 318/715 |
| 5,332,955 | 7/1994 | Hopper | 318/632 |
| 5,381,081 | 1/1995 | Radun | 318/701 |
| 5,394,323 | 2/1995 | Yellowley et al. | 364/167 |
| 5,404,091 | 4/1995 | Radun | 318/701 |
| 5,448,149 | 9/1995 | Ehsani et al. | 318/701 |
| 5,467,025 | 11/1995 | Ray | 318/701 X |
| 5,488,531 | 1/1996 | Aldridge et al. | 363/56 |
| 5,491,622 | 2/1996 | Carosa | 363/56 |
| 5,493,195 | 2/1996 | Heglund et al. | 318/701 |
| 5,499,186 | 3/1996 | Carosa | 363/56 |
| 5,525,886 | 6/1996 | Lyons et al. | 318/701 |
| 5,627,444 | 5/1997 | Fulks | 318/701 |
| 5,637,974 | 6/1997 | McCann | 318/701 |

FOREIGN PATENT DOCUMENTS 401818 12/1990 European Pat. Off. .
WO 97 38484 10/1997 WIPO .

OTHER PUBLICATIONS

Reynolds et al, "Robust Estimation of Covariance Matrices", IEEE Transactions on Automatic Control, Sep. 9, 1990.

N.M. Mvungi et al., "Sensorless Rotor Position in an SR Motor", European Conference on Power Electronics and Application, Sep. 3–6, 1991.

Ramani et al., "New Communication Methods in Switched Reluctance Motors Based on Active Phase Vectors", Proceedings of the Annual Power Electronics Specialists Conference, Jun. 20–24, 1994.

(List continued on next page.)

Primary Examiner—Bentsu Ro
Attorney, Agent, or Firm—Jeffery J. Makeever

[57] ABSTRACT

A control for operating an inverter coupled to a switched reluctance machine includes a relative angle estimation circuit for estimating rotor angle for a phase in the switched reluctance machine. The relative angle estimation circuit estimates a phase voltage and thereby calculates phase flux linkage to estimate the rotor angle.

10 Claims, 11 Drawing Sheets

OTHER PUBLICATIONS

Panda et al., "Further Developments in Indirect–Rotor Position Sensing of Variable–Reluctance Motors Using Wave Form Detection Technique", Power Electronics, Nov. 15–19, 1993.

Cailleux et al., "Effect of the Sampling and the Phase Commutation in Nonlinear Position Control of a Switched Reluctance Motor–Analysis and Compensation", Proceedings of the 32nd Conference on Design and Control, Dec. 1993.

Bado et al., "Effective Estimation of Speed and Rotor Position of a PM Synchronous Motor Drive By a Kalman Filtering Technique", Proceedings of the Annual Power Electronics Specialists Conference, Jun. 29–Jul. 3, 1992.

*Design and Implementation of a Five Horsepower, Switched Reluctance, Fuel–Lube, Pump Motor Drive for a Gas Turbine Engine* written by Caio A. Ferreira, Stephen R. Jones, Barry T. Drager and William S. Heglund, IEEE Ninth Annual Applied Power Electronics Conference and Exposition, Feb. 13–17, 1994.

*Practical Indirect Position Sensing for a Variable Reluctance Motor* written by Walter D. Harris and submitted to the Massachusetts Institute of Technology, May 1987.

*A Simple Motion Estimator for Variable–Reluctance Motors*, written by Walter D. Harris and Jeffrey H. Lang, published in IEEE, vol. 26, No. 2. Mar./Apr. 1990.

*Application of Sensor Integration Techniques to Switched Reluctance Motor Drives* written by Stephen R. MacMinn, William J. Rzesos, Paul M. Szczesny and Thomas M. Jahns, published in IEEE vol. 28, No. 6, Nov./Dec. 1992.

*An Analysis of the Error in Indirect Rotor Position Sensing of Switched Reluctance Motors*, written by M. Ehsani, I. Husain and K.R. Ramani, Department of Electrical Engineering, Texas A&M University, College Station, Texas, 1991.

*New Modulation Encoding Techniques for Indirect Rotor Position Sensing in Switched Reluctance Motors*, written by Mehrdad Ehsani, Iqbal Husain, S. Mahajan, and K.R. Ramani, published in IEEE, vol. 30, No. 1, Jan./Feb. 1994.

*Flux/Current Methods for SRM Rotor Position Estimation*, written by J.P. Lyons, S.R. MacMinn and M.A. Preston, published in May/1991 IEEE.

Article entitled *Low Cost Sensorless Switched Reluctance Motor Drives for Automotive Applications*, (1990) by M. Ehsani and I. Husain, Power Electronics Laboratory, Dept. of Electrical Engineering, Texas A&M University, College Station, TX 77843.

RELATIVE ANGEL ESTIMATION APPARATUS FOR A SENSORLESS SWITCHED RELUCTANCE MACHINE SYSTEM

BACKGROUND AND SUMMARY OF INVENTION

The present invention relates generally to motors/generators, more particularly, to high speed switched reluctance machines capable of starting a prime mover as well as generating electrical power for use on aircraft.

The aerospace industry has consistently driven the leading edge of technology with the requirement for lightweight, high efficiency, high reliability equipment. The equipment must be lightweight because each additional pound of weight translates directly into increased fuel burn, and therefore, a higher cost of ownership and shorter range. The need for high efficiency results from the fact that each additional cubic inch required for equipment displaces the amount of revenue-generating cargo and passengers that can be carried on an aircraft. High reliability is important because every minute of delay at the gate increases the cost of ownership, and likewise, increases passenger frustration.

For aircraft electric power generation systems, these pressures have precipitated great advancements in technology, but have also caused problems. Aircraft have typically used synchronous brushless AC generators or permanent magnet generators for electric power generation needs. Unfortunately, both of these types of generators require components which can fail due to the conditions under which they are required to operate (usually mounted directly on the aircraft jet engine).

In addition to an electrical generator, an engine starter is also typically installed on the aircraft engine. This component is used only during starting, which occupies only a very small fraction of each operational cycle of the aircraft. In effect, the starter becomes excess baggage during the remainder of the flight, increasing overall weight, fuel burn, and cost of ownership, and decreasing overall range. This problem has been recognized and efforts have been expended to combine the starter and generator into a single package, thus eliminating the need for an additional piece of equipment used only a fraction of the time. Unfortunately, using synchronous AC or permanent magnet generators for this purpose, in addition to creating new problems associated with the start function, does not eliminate the inherent problems with these machines as described above.

As an alternative to the use of the synchronous AC or the permanent magnet generator for this combined starter/generator function, a switched reluctance machine can be used. A switched reluctance machine is an inherently low cost machine, having a simple construction which is capable of very high speed operation, thus yielding a more lightweight design. The rotor of the switched reluctance machine is constructed from a simple stack of laminations making it very rugged and low cost without the containment problems associated with rotor windings or permanent magnets. Further, the rotor does not require rotating rectifiers, which contribute to failures, as does the AC synchronous machine.

In order to properly operate a switched reluctance machine, it has been found necessary in the past to determine the rotor position in order to properly commutate the currents flowing in the phase windings of the machine. Resolvers are used, particularly in high speed systems, or sometimes encoders in lower speed systems, to obtain a measure of rotor position. However, resolvers and required associated apparatus (chiefly, a resolver-to-digital converter and an excitation circuit) are expensive and both resolvers and encoders are a source of single point failure.

In order to obviate the need for position sensors, such as resolvers or encoders, sensorless operational techniques have been developed. The most trivial solution to sensorless operation is to control the switched reluctance machine as a stepper motor in the fashion disclosed in Bass, et al. U.S. Pat. No. 4,611,157 and MacMinn U.S. Pat. No. 4,642,543. In an alternative technique, machine inductance or reluctance is detected and utilized to estimate rotor position. Specifically, because the phase inductance of a switched reluctance machine varies as a function of angle from alignment of the stator pole for that phase and a rotor pole, a measurement of instantaneous phase inductance can be utilized to derive an estimate of rotor position. See MacMinn, et al. U.S. Pat. No. 4,772,839, MacMinn, et al. U.S. Pat. No. 4,959,596, Harris "Practical Indirect Position Sensing for a Variable Reluctance Motor," Masters of Science Thesis, MIT, May 1987, Harris, et al. "A Simple Motion Estimator for Variable Reluctance Motors," IEEE Transactions on Industrial Applications, Vol. 26, No. 2, March/April, 1990, and MacMinn, et al. "Application of Sensor Integration Techniques to Switched Reluctance Motor Drives," IEEE Transactions on Industry Applications, Vol. 28, No. 6, November/December, 1992.

More particularly, the phase inductance L, for a given phase current $I_{phase}$ and a given flux linkage $\Psi$, is defined as:

$$L = \Psi / I_{phase}$$

wherein the flux linkage for the particular phase can be calculated for a given phase voltage $V_{phase}$ and a given phase resistance $R_{phase}$ as follows:

$$\Psi = \int (V_{phase} - I_{phase} R_{phase}) dt + C$$

Previous techniques for sensorless determination of rotor position have actually measured phase voltage and current magnitudes. However, measurement of the phase voltage magnitude results in the need for additional sensors and conductors between the inverter and the controller, thereby introducing additional costs and potential for failures.

In a further technique, phase inductance can be determined using a frequency modulation approach whereby a non-torque producing phase forms part of a frequency modulation encoder. See Ehsani, et al. "Low Cost Sensorless Switched Reluctance Motor Drives for Automotive Applications," Texas A&M Power Electronics Laboratory Report (date unknown), Ehsani, et al. "An Analysis of the Error in Indirect Rotor Position Sensing of Switched Reluctance Motors," IEEE Proceedings IECON '91, Ehsani "A Comparative Analysis of SRM Discrete Shaft Position Sensor Elimination by FM Encoder and Pulsed Impedance Sensing Schemes," Texas A&M Power Electronics Laboratory Report, (date unknown) and Ehsani, et al. "New Modulation Encoding Techniques for Indirect Rotor Position Sensing in Switched Reluctance Motors," IEEE Transactions on Industry Applications, Vol. 30, No. 1, January/February, 1994.

A model-based approach to rotor position estimation has been developed by General Electric Company and is disclosed in Lyons, et al. "Flux/Current Methods for SRM Rotor Position Estimation," Proceedings of IEEE Industry Applications Society Annual Meeting, Vol. 1, 1991, and Lyons, et al. U.S. Pat. No. 5,097,190. In this technique, a multi-phase lumped parameter model of the switched reluctance machine is developed and utilized. However, the model has been developed only for a three-phase machine wound in a north-south-north-south-north-south configuration.

A position estimation subsystem has been developed by the assignee of the instant application and includes a relative angle estimation circuit, an angle combination circuit and an estimator in the form of a Kalman filter. The relative angle estimation circuit is responsive to the phase currents and voltages of the switched reluctance machine and develops an angle estimate for each phase. The angle combination circuit combines the phase angle estimates to obtain an absolute angle estimate which eliminates ambiguities that would otherwise be present. The Kalman filter utilizes a model of the switched reluctance machine system as well as the absolute angle measurement to form a better estimate of the rotor position and velocity and, if necessary or desirable for other purposes, the rotor acceleration.

The simplest approach is to utilize the estimated rotor position developed by the Kalman filter to directly control commutation. However, the time required to estimate rotor position limits the number of position estimates that can be developed per electrical cycle by the Kalman filter, and hence an instantaneous position generation circuit is provided to convert the output of the Kalman filter to a signal that can properly control commutation.

An object of the present invention is to provide a flux integrator for use in the above-noted relative angle estimation circuit for deriving an estimate of rotor angle utilizing estimates of the phase voltage dependent upon a logic state of the commutation circuitry. It is further an object to provide a control for a sensorless switched reluctance machine wherein the control has a minimum number of components, thereby reducing complexity and costs. It is yet a further object to increase reliability without any sacrifice in precision.

These and other objects and advantages are attained by the provision of an apparatus that estimates the phase voltage and thereby computes the flux linkage for each phase to estimate the relative angular position of the rotor.

In one embodiment of the invention, the flux linkage is calculated by an analog flux integrator.

In another embodiment of the invention, a digital flux integrator calculates the flux linkage to improve reliability, decrease costs by reducing the number of components and increase the speed by removing analog to digital conversion steps. Still further, the digital flux integrator has the flexibility to be implemented through discrete digital logic hardware, a programmable logic device, a custom logic device, software or some combination thereof.

In yet another embodiment of the invention, in the event of a sufficiently high DC bus voltage magnitude, the flux integrator can be simplified.

These and other objects, advantages and novel features of the present invention will become apparent to those skilled in the art from the drawings and following detailed description.

DESCRIPTION OF THE PREFERRED EMBODIMENTS

Figure 1:
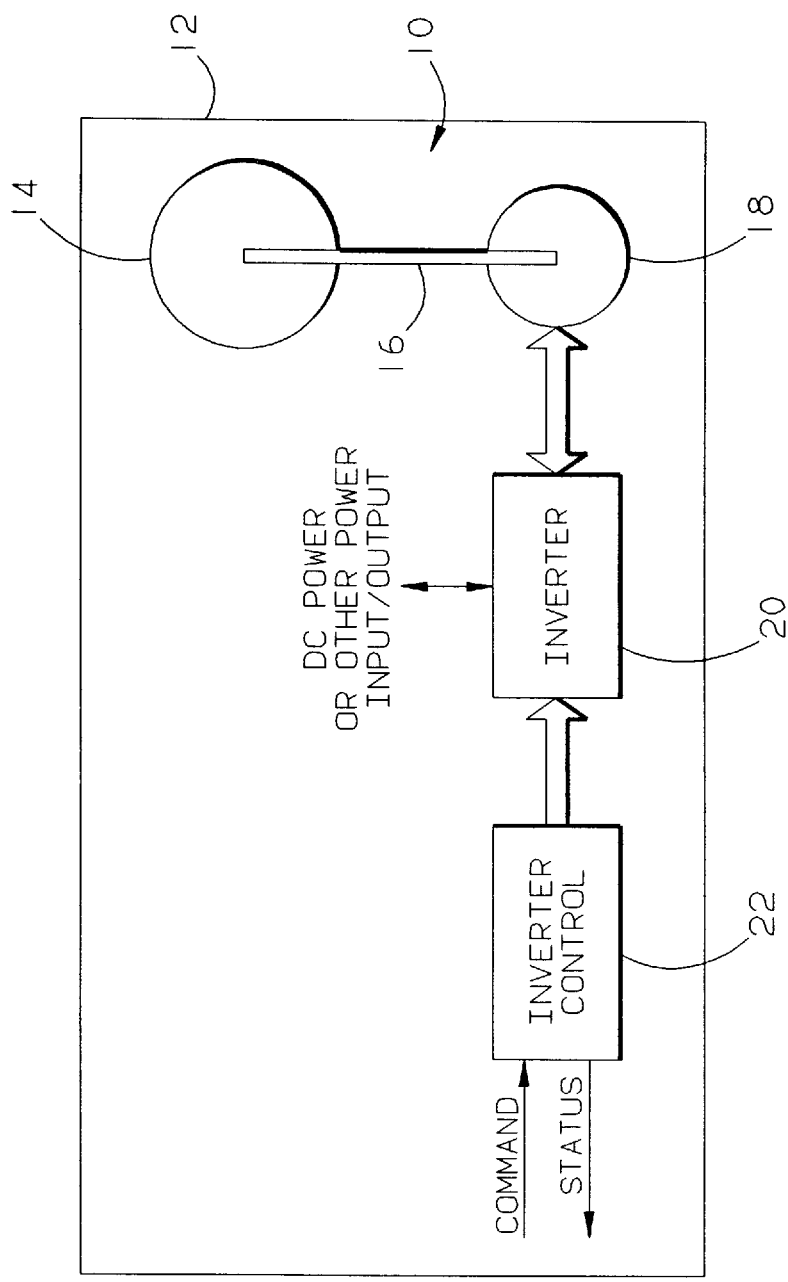
FIG. 1 comprises a block diagram of a starting/generating system for an aircraft.

Referring first to FIG. 1, a power conversion system 10 is provided on-board an aircraft (shown diagrammatically at 12) or other aerospace, land or water vehicle and includes a prime mover, for example, a gas turbine engine 14, which is coupled by a motive power shaft 16 to a switched reluctance machine 18. The machine 18 includes phase windings which are coupled to an inverter 20 operated by an inverter control 22. In a starting mode of operation, DC power is supplied to the inverter 20 and the inverter control 22 develops control signals for switches in the inverter 20 to cause the switched reluctance machine 18 to operate as a motor and supply motive power via the shaft 16 to the gas turbine engine 14 for starting purposes. During operation in a generating mode, motive power is supplied by the gas turbine engine to the switched reluctance machine 18 via the shaft 16 and the resulting electrical power developed by the switched reluctance machine 18 is converted by the inverter 20 into DC power for one or more loads. If necessary or desirable, the inverter 20 could be modified to develop constant frequency AC power for one or more AC loads.

Figure 2:
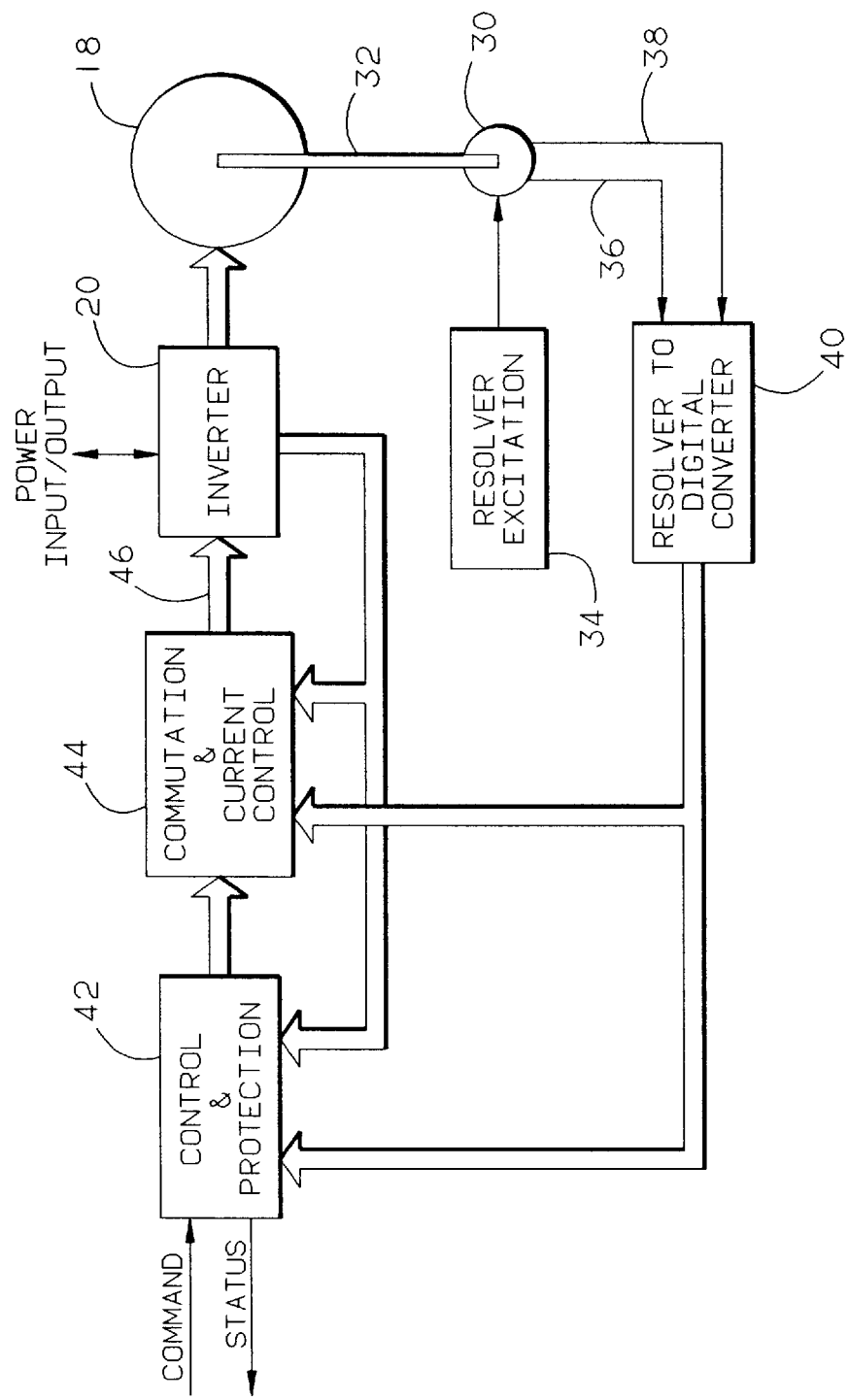
FIG. 2 comprises a block diagram of a prior art inverter control, inverter and switched reluctance machine.

Referring now to FIG. 2, a prior art inverter control for operating the switched reluctance machine 18 includes a resolver 30, which is coupled by a motive power shaft 32 to the rotor of the switched reluctance machine 18. Excitation is provided by a resolver excitation circuit 34. The resolver 30 develops first and second signals over lines 36 and 38 that have a phase quadrature relationship (also referred to as sine and cosine signals). A resolver-to-digital converter 40 is responsive to the magnitudes of the signals on the lines 36 and 38 and develops a digital output representing the position of the rotor of the switched reluctance machine 18. The position signals are supplied along with a signal representing machine rotor velocity to a control and protection circuit 42. The rotor position signals are also supplied to a commutation and current control circuit 44 having an input coupled to an output of the control and protection circuit 42.

The circuits 42 and 44 further receive phase current magnitude signals as developed by the inverter 20. The circuits 42 and 44 develop switch drive signals on lines 46 for the inverter 20 so that the phase currents flowing in the windings of the switched reluctance machine 18 are properly commutated.

As noted previously, the resolver 30 is expensive and inherently a source of single point failure. Further, the resolver-to-digital converter 40 is also an expensive component and, hence, it is desirable to eliminate these and other components (including the excitation circuit 34), if possible.

Figure 3:
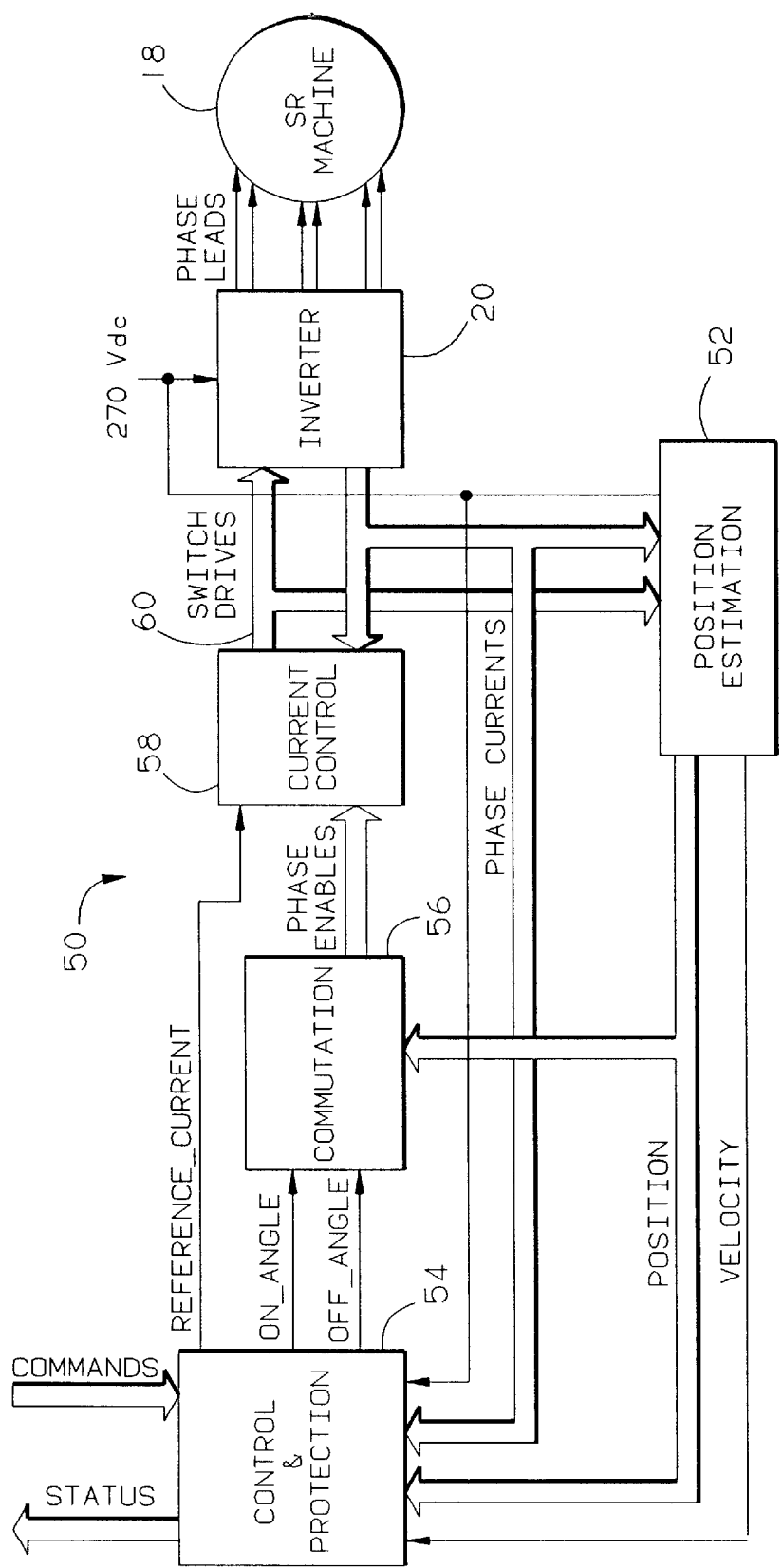
FIG. 3 comprises a block diagram of an inverter control including a current control together with an inverter and a switched reluctance machine according to the present invention.

FIG. 3 illustrates an inverter control 50 that incorporates the present invention together with the inverter 20 and the switched reluctance machine 18. A position estimation circuit 52 is responsive to the phase current magnitudes developed by the inverter 20, switch command or drive signals for switches in the inverter 20 and DC bus voltage magnitude to develop position and velocity estimate signals for a control and protection circuit 54. In addition, the position estimate signals are supplied to a commutation circuit 56. A current control circuit 58 is responsive to the phase current magnitudes developed by the inverter 20, as well as phase enable output signals developed by the commutation circuit 56 and a reference current signal developed by the control and protection circuit 54. The current control circuit 58 produces the switch command or drive signals on lines 60 for the inverter 20.

Figure 4:
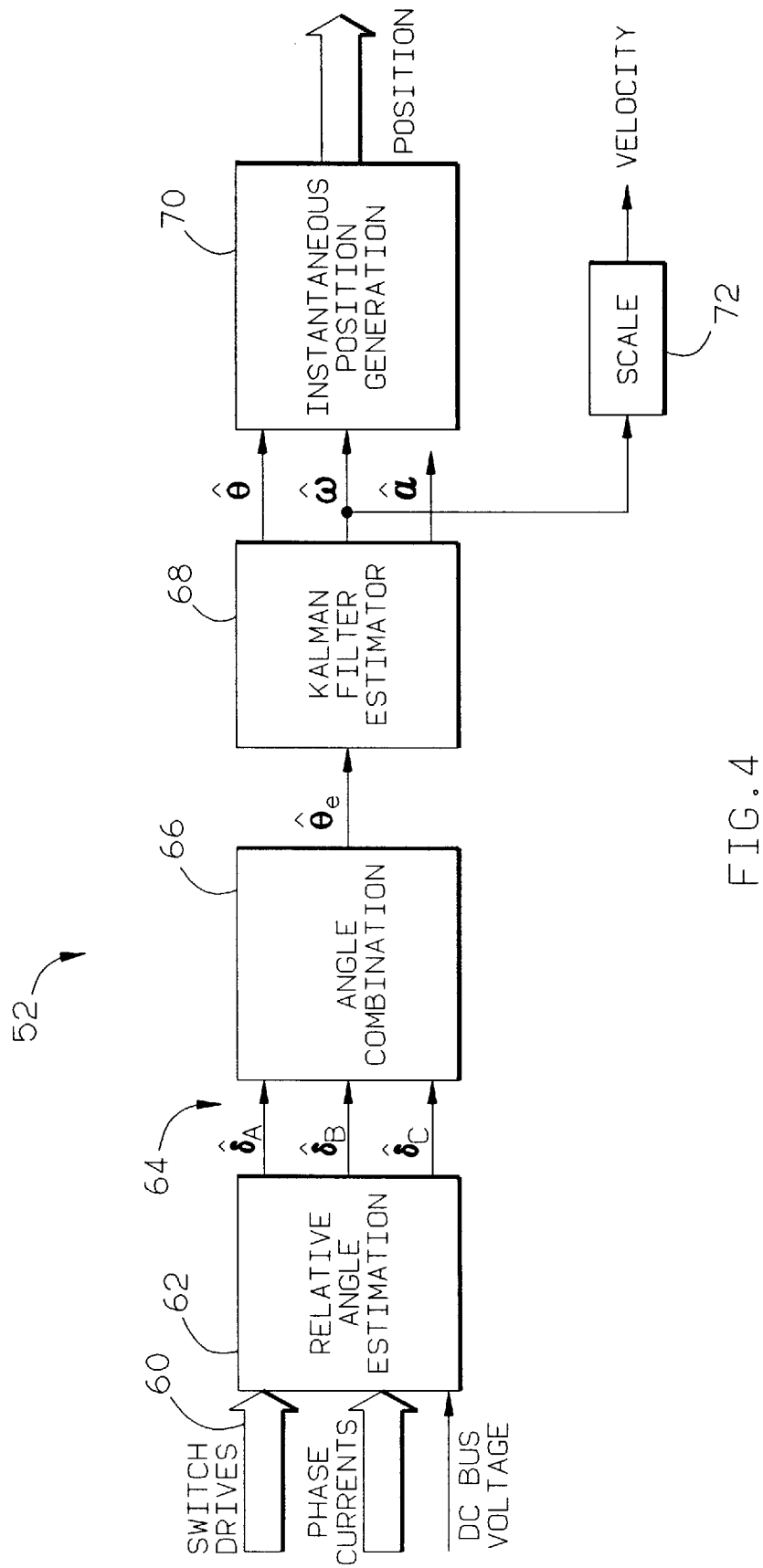
FIG. 4 comprises a block diagram of the position estimation circuit of FIG. 3.

FIG. 4 illustrates the position estimation circuit 52 in greater detail. A relative angle estimation circuit 62 is responsive to the switch drive signals, the DC bus voltage and the phase current magnitudes developed by the inverter 20 and develops a set of output signals $\hat{\delta}_A$, $\hat{\delta}_B$, $\hat{\delta}_C$ on lines 64 each representing an estimate of instantaneous angle from rotor/stator pole alignment for a particular phase of the machine 18. It should be noted that, while three angle estimate signals $\hat{\delta}_A$, $\hat{\delta}_B$, $\hat{\delta}_C$ are developed by the circuit 62 of FIG. 4 wherein each represents the estimated instantaneous angle for the phases of a three-phase switched reluctance machine 18, a different number of signals would be developed on the lines 64 if the machine has a different number of phases, one for each of the machine phases.

Each angle estimate signal $\hat{\delta}_A$, $\hat{\delta}_B$, $\hat{\delta}_C$ represents two possible solutions for estimated rotor position, either phase advanced with respect to (i.e., moving toward) the respective phase pole or phase delayed with respect to (i.e., moving away from) the respective phase pole. This ambiguity is removed by an angle combination circuit 66 which combines the signals $\hat{\delta}_A$, $\hat{\delta}_B$, $\hat{\delta}_C$ to obtain an absolute angle estimate $\hat{\theta}_e$. The angle estimate $\hat{\theta}_e$ is provided to an estimator 68, preferably including a Kalman filter, which improves the estimate of rotor position to obtain a value $\hat{\theta}$. In addition, the estimator 68 develops a velocity estimate $\hat{\omega}$ and further develops an estimated acceleration signal $\hat{\alpha}$ representing the estimated acceleration of the machine rotor. The acceleration signal $\hat{\alpha}$ may be used by other circuits (not shown). The signals $\hat{\theta}$ and $\hat{\omega}$ are supplied to an instantaneous position generation circuit 70 according to the present invention which develops a signal representing estimated rotor position.

If desired, the estimator 68 may include an implementation other than a Kalman filter.

The signal $\hat{\omega}$ is further supplied to a scaling circuit 72 which in turn develops a velocity estimate signal in the correct units (e.g., rpm's) for the control and protection circuit 54 of FIG. 3.

Figure 5:
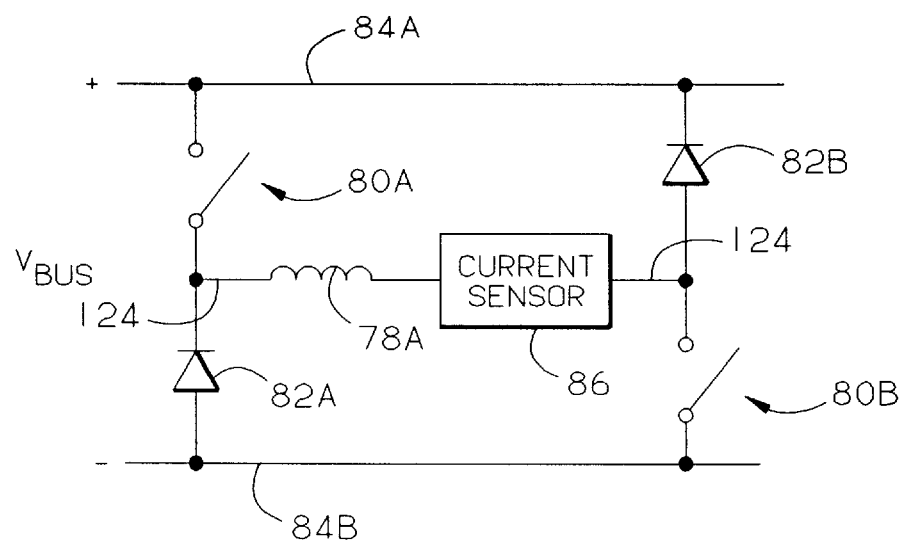
FIG. 5 comprises a block diagram of an inverter topology incorporating the present invention.

The inverter 20 preferably has a topology including a plurality of phases or inverter legs wherein each phase or leg is connected to one phase winding. FIG. 5 illustrates a portion of the inverter 20 showing a single inverter phase A connected to a phase winding 78A including first and second switches 80A and 80B coupled with first and second diodes 82A and 82B between positive and negative lines 84A and 84B of a DC bus 84 and the phase winding 78A. A current sensor 86 detects the magnitude of current flowing through the phase winding 78A, and preferably is of the Hall effect type.

Figure 6:
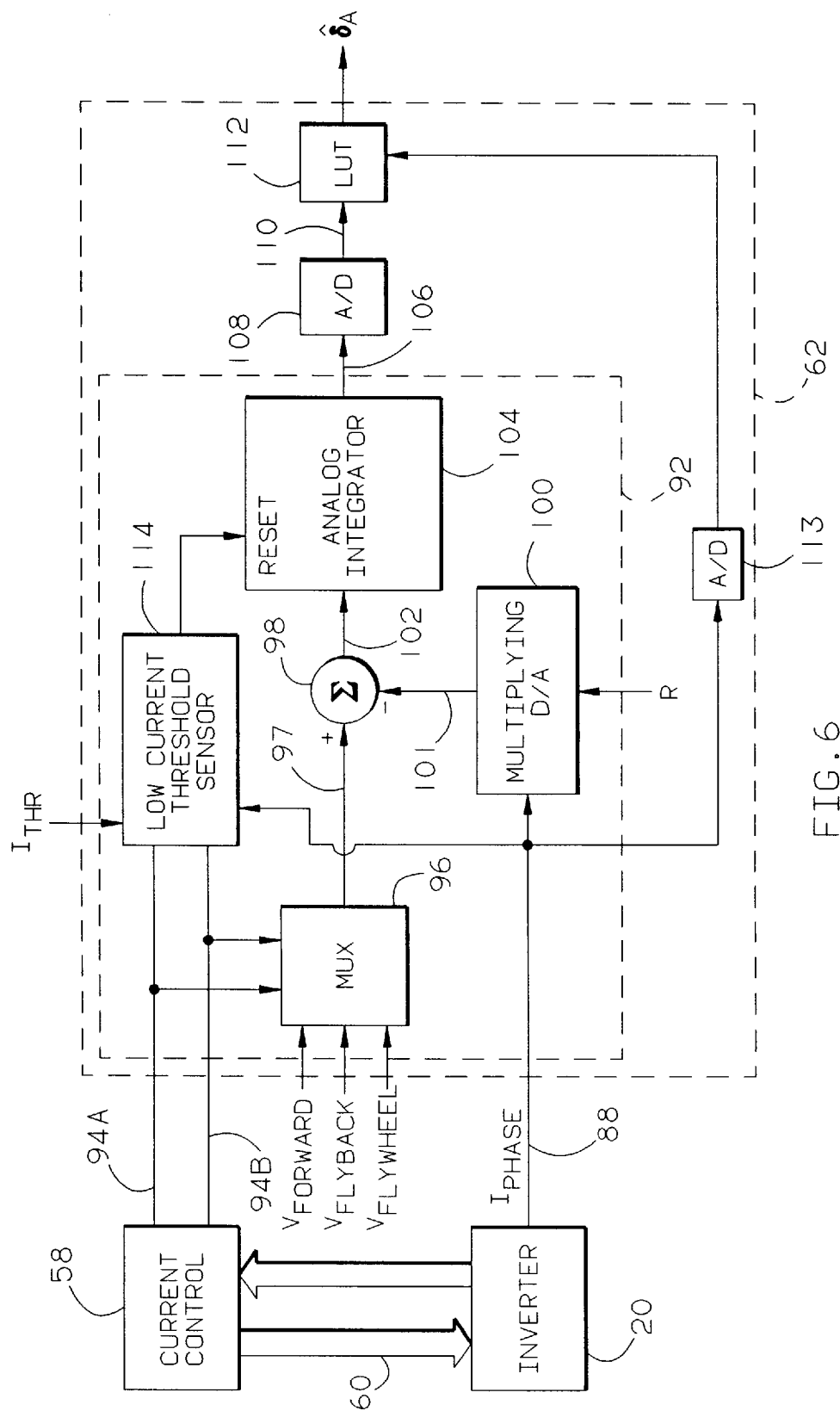
FIG. 6 comprises a block diagram of an analog flux integrator together with the inverter and current control of FIG. 3 according to one embodiment of the present invention.

FIG. 6 illustrates the relative angle estimation circuit 62 in greater detail together with the inverter 20 and the current control 58. The current sensor 86 provides an analog signal on a line 88 representative of the magnitude of the phase current to an analog flux integrator 92 which calculates the phase flux linkage $\Psi$ for a particular phase (here, phase A) according to the mathematical formula described hereinabove. As in other embodiments described hereinafter, the analog flux integrator 92 for the phase winding 78A is replicated for each additional phase and may be implemented with any suitable hardware known in the art to be capable of performing the required calculations.

The analog flux integrator 92 is responsive to first and second switch command signals on lines 94A and 94B developed by the current control 58. The first and second switch command signals on the lines 94A and 94B control the first and second inverter switches 80A and 80B, respectively, (FIG. 5) and define a plurality (i.e., four) of logic states for the phase. These logic states include both switches on, both switches off and two states where one switch is on and the other is off. In accordance with the logic state of the phase, a multiplexer 96 selects from among three signals a value to be utilized in calculating an estimate of a phase voltage magnitude developed across the phase winding 78A. The multiplexer 96 then provides the value over a line 97 to a noninverting input of an adder 98.

A multiplying digital-to-analog converter 100 includes a first input terminal that receives the current magnitude signal developed by the current sensor on the line 88 and a second input terminal that receives a digital scale factor signal R from a digital signal processor (DSP) or any other suitable hardware and/or software components. The multiplying digital-to-analog converter 100 multiplies the phase current magnitude signal on the line 88 with the digital scale factor R. In the preferred embodiment, the scale factor R is representative of a particular resistance, or combination of resistances (to be defined hereafter), and may either be a constant value or variable value, for example, to account for temperature effects on the various resistances utilized in calculating the flux linkage.

The multiplying digital-to-analog converter 100 develops a signal on a line 101 coupled to an inverting input of the adder 98. The adder 98, in turn, provides a signal on a line 102 representative of the difference between the signal on the line 97 and the scaled phase current magnitude signal on the line 101 to an analog integrator 104.

The analog integrator 104, which may be an op-amp integrating circuit, provides an analog signal 106 representative of the flux linkage $\Psi$ to an analog-to-digital converter 108 to develop a digital signal on a line 110 coupled to a digital look-up table (LUT) 112. The LUT 112, which may be implemented by the DSP or any other memory device, is further responsive to a digital signal developed by an analog-to-digital converter 113 representing phase current magnitude. The LUT 112 stores values of $\hat{\delta}_A$ representing pairs of potential angular positions of the rotor at table addresses defined by particular values of the flux linkage $\Psi$ and magnitudes of phase current and provides the values of $\hat{\delta}_A$ to the angle combination circuit 66 in FIG. 4, as previously noted.

The values of $\hat{\delta}_B$ and $\hat{\delta}_C$ are developed by identical circuitry or are developed by the same circuitry on a time-multiplexed basis and are provided to the angle combination circuit 66 of FIG. 4, as previously noted.

The analog integrator 104 is initialized by a low current threshold sensor 114, which is responsive to the first and second switch command signals on the lines 94A and 94B and the analog phase current magnitude signal on the line 88. As seen in greater detail in FIG. 7, the low current threshold sensor 114 includes a current comparator 116 for comparing the phase current magnitude signal on the line 88 with a predetermined low current threshold value $I_{THR}$ which may be provided by the DSP. The first and second switch command signals on the lines 94A and 94B are provided to a NOR gate 118 having an output which is coupled together with an output of the current comparator 116 to an AND gate 120. The AND gate 120, in turn, provides a first or control reset signal on a line 122 to an OR gate having an output coupled to the analog integrator 104. The OR gate 124 is also responsive to a second or forced reset signal on a line 125, which may be provided by the DSP. It should be noted that the low current threshold sensor 114 is preferably implemented by hardware, although software could alternatively be used. Further, the current comparator 116 may alternatively be a digital comparator, in which case the digital current magnitude signal developed by the analog-to-digital converter 113 may be provided thereto instead of the analog signal from the inverter 20.

In operation, if the first and second switch command signals on the lines 94A and 94B are both high, both the first and second inverter switches 80A and 80B are closed and the phase A is said to be in a forward conduction condition. In the forward conduction condition, the phase winding 78A is thus directly connected across the DC voltage bus 84. Accordingly, using circuit analysis techniques and neglecting the effects of such components as the current sensor 86, the phase voltage $V_{phase(forward)}$ can be estimated as follows:

$$V_{phase(forward)} = V_{bus} - I_{phase}(2R_{feeder} + 2R_{switch}) - 2V_{switch}$$

where:

$V_{bus}$ represents the voltage across the DC voltage bus 84 and is measured by the control and protection circuit 54 through a high impedance connection to the DC voltage bus 84;

$I_{phase}$ represents the current magnitude through the phase winding 78A and is measured by the current sensor 86;

$R_{feeder}$ represents the resistance of a pair of feeder lines 124 (FIG. 5) connecting the inverter 20 to the phase winding 78A;

$R_{switch}$ represents the main current path resistance of either the first or second inverter switch 80A or 80B (assumed to be equal for both inverter switches); and $V_{switch}$ represents the voltage across either the first or second inverter switch 80A or 80B (assumed to be a constant value and equal for both inverter switches).

Similarly, if the first and second switch command signals on the lines 94A and 94B are low, then both the first and second inverter switches 80A and 80B are open, and the phase A is said to be in a flyback condition. In the flyback condition, current flows through the first and second diodes 82A and 82B and, therefore, the phase voltage $V_{phase(flyback)}$ can be estimated as follows:

$$V_{phase(flyback)} = -V_{bus} - I_{phase}(2R_{feeder} + 2R_{diode}) - 2V_{diode}$$

where:

$R_{diode}$ represents the forward resistance of either the first or second diode 82A or 82B (assumed to be equal for both diodes); and $V_{diode}$ represents the forward voltage across either the first or second diode 82A or 82B (assumed to be a constant value and equal for both diodes).

Finally, when only one of the first or second switch command signals on the lines 94A or 94B is high, either the first or second inverter switch 80A or 80B is closed and the other is open and the phase A is said to be in a flywheel condition wherein the phase voltage $V_{phase(flywheel)}$ can be estimated as follows:

$$V_{phase(flywheel)} = -I_{phase}(2R_{feeder} + R_{diode} + R_{switch}) - V_{diode} - V_{switch}$$

As seen in FIG. 6, the multiplexer 96 is responsive to the switch command signals on the lines 94A and 94B to provide one of the three signals or values $V_{forward}$, $V_{flyback}$ or $V_{flywheel}$ to the adder 98. Each of the three values represents the sum of those terms in the above-identified equations for estimating the phase voltage not multiplied with the phase current magnitude. For example, $V_{forward}$ is defined as follows:

$$V_{forward} = V_{bus} - 2V_{switch}$$

and, accordingly, the phase voltage can be rewritten as:

$$V_{phase(forward)} = V_{forward} - I_{phase}(2R_{feeder} + 2R_{switch}).$$

Likewise, the other two signals, $V_{flyback}$ and $V_{flywheel}$, provided to the multiplexer 96 are defined as follows:

$$V_{flyback} = -V_{bus} - 2V_{diode}$$

$$V_{flywheel} = -V_{diode} - V_{switch}.$$

It should be noted that the multiplexer includes four inputs and that the signal $V_{flywheel}$ is provided to the two inputs of the multiplexer 96 selected by the two possible logic states of the signals on the lines 94A and 94B when one inverter switch is open and the other is closed. Further, the signals $V_{forward}$, $V_{flyback}$ and $V_{flywheel}$ may be calculated by op-amp circuitry from which data representing the above voltage terms are provided.

Once the appropriate signal is provided on the line 97 by the multiplexer 96, the adder 98 computes the integrand of the flux linkage equation by subtracting those terms having an $I_{phase}$ factor (i.e., those terms represented by the signal on the line 101) from those terms in the appropriate $V_{phase}$ equation not having an $I_{phase}$ factor (i.e., those terms represented by the signal on the line 97). For example, if phase A is in the flyback condition, the flux linkage equation can be rewritten as follows:

$$\Psi = \int([-V_{bus} - 2V_{diode}] - I_{phase}[2R_{feeder} + 2R_{diode} + R_{phase}])dt + C.$$

In order to calculate the above equation, the scale factor R provided to the multiplying digital-to-analog converter 100 is set equal to $[2R_{feeder} + 2R_{diode} + R_{phase}]$ and the multiplexer 96 selects the $V_{flyback}$ signal, which is representative of $[-V_{bus} - 2V_{diode}]$.

In practice, the calculation of the scale factor R is simplified by assuming that $R_{switch} = R_{diode}$. Under this assumption, the scale factor R does not change in dependence upon the conduction states of the switches 80A, 80B and hence R is calculated once and is provided to the converter 100.

Figure 7:
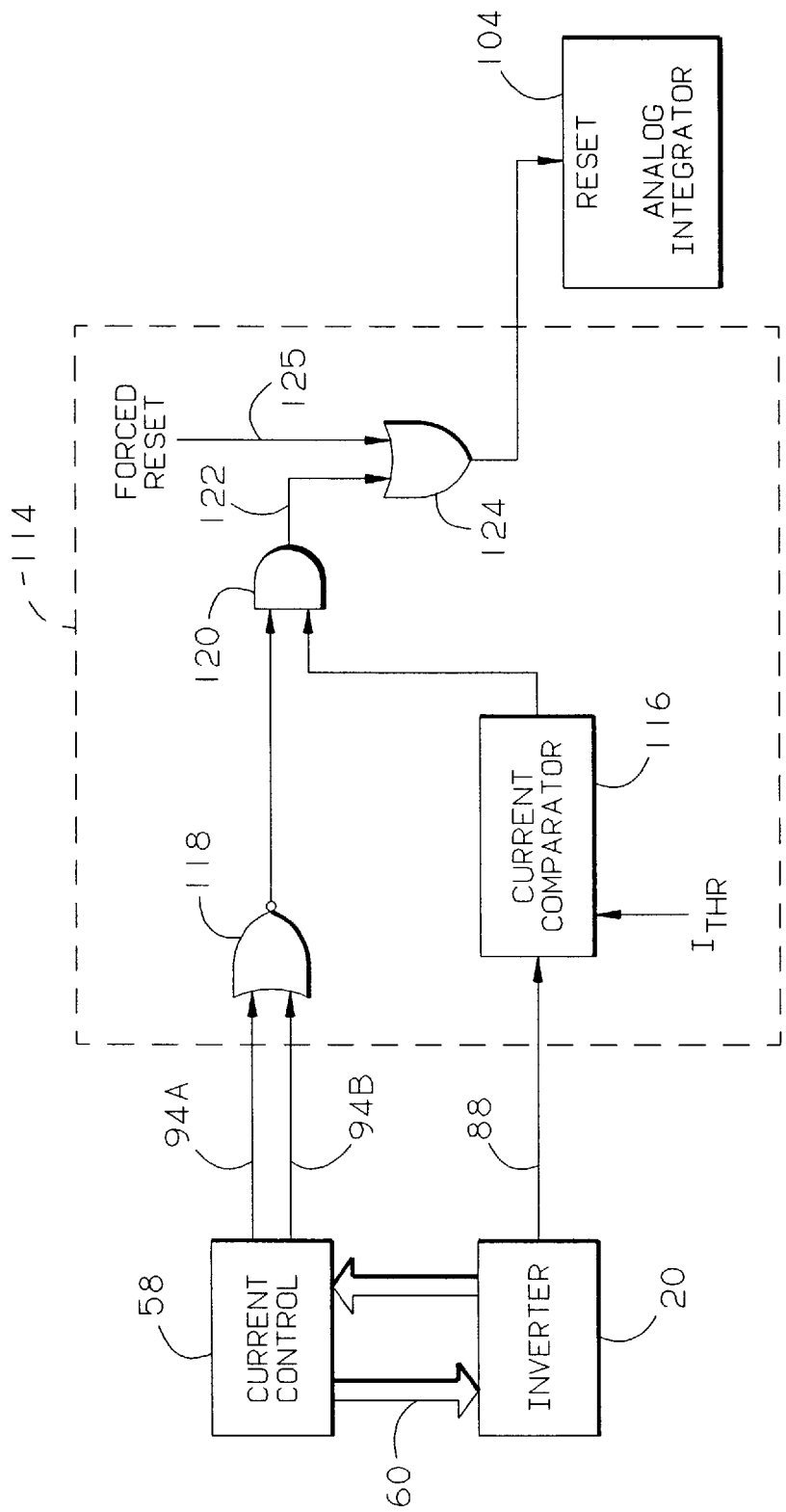
FIG. 7 comprises a block diagram of a low current threshold sensor together with a portion of the relative angle estimation circuit, current control and inverter of FIG. 6.

However, the low threshold current sensor 114 must additionally initialize or reset the analog integrator 104 whenever the phase winding 78A is not being energized to set the constant C generated by the integration computation equal to zero. As seen in FIG. 7, the integrator 104 is reset by the AND gate 120 of the low current threshold sensor 114 when both the first and second switch command signals on the lines 94A and 94B are low (i.e., when the phase winding 78A is not being energized by the DC voltage bus 84) and when the phase current magnitude falls below the predetermined low threshold value. The integrator 104 can also be reset by the DSP simply through the forced reset signal on the line 125.

Another embodiment of the present invention performs the above calculations digitally rather than using analog signals as described above. This embodiment of the present invention may increase the speed of the calculation by eliminating the time required for analog-to-digital conversions and further eliminates the need for certain components, such as the analog-to-digital converter 108. Still further, it has been found that the digital implementation may provide greater precision and is less likely to experience performance degradation during the lifetime of the system. This embodiment may be implemented by one or more suitable digital components, such as a suitably programmed DSP.

Figure 8:
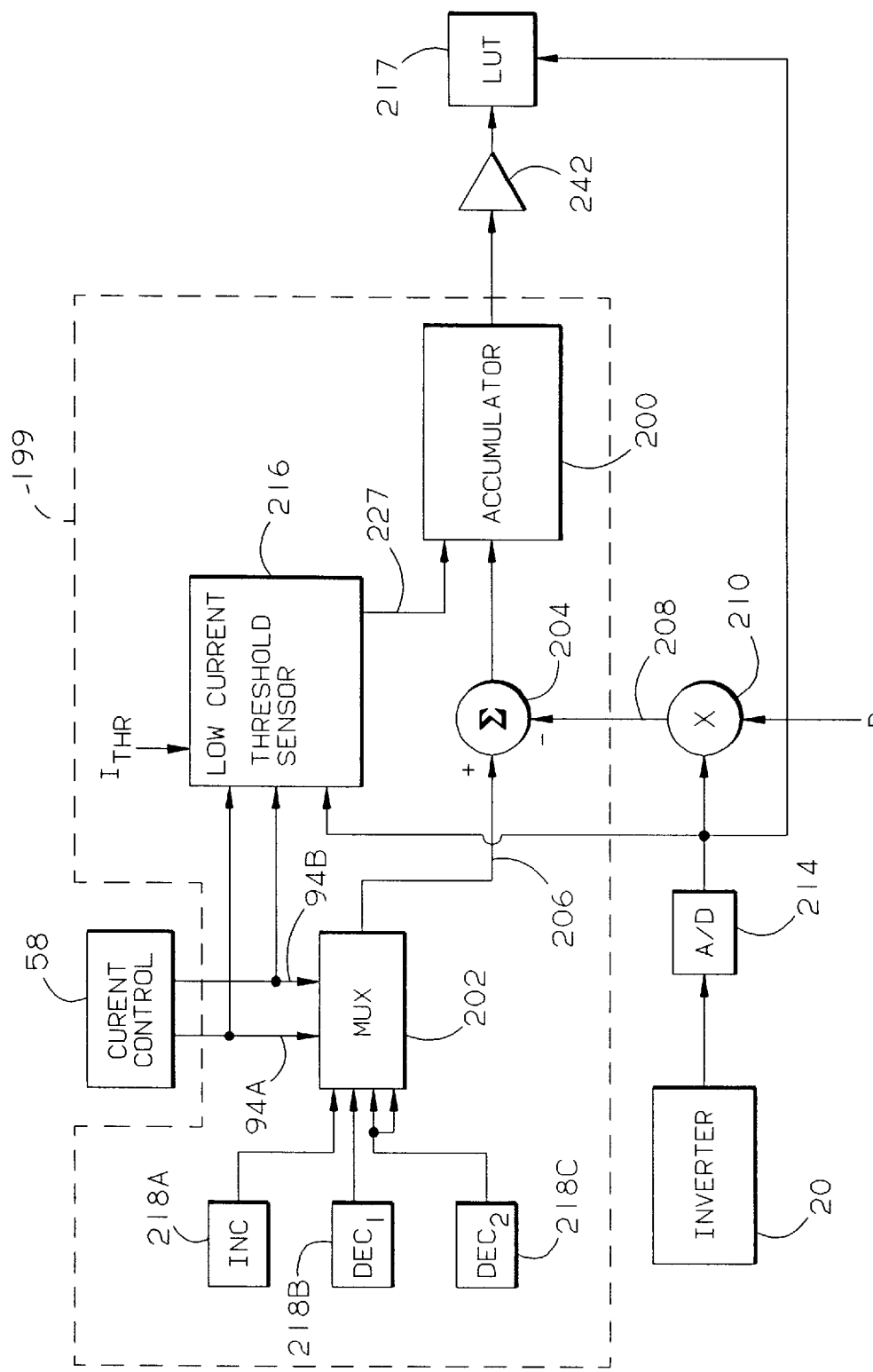
FIG. 8 comprises a block diagram of a digital flux integrator together with the inverter and current control of FIG. 3 according to another embodiment of the present invention.

Accordingly, as seen in FIG. 8, the analog flux integrator 94 of the previous embodiment is replaced by a digital flux integrator 199 having a digital accumulator 200, which preferably is a high speed bidirectional accumulator having variable increment/decrement capability. A digital multiplexer 202 is coupled to an adder 204 which, in turn, is coupled to the accumulator 200. The adder 204 computes the difference between a signal on an output line 206 of the multiplexer 202 and a signal developed on a line 208 by a multiplier 210. The multiplier 210 receives a signal R for multiplication with a digital phase current magnitude signal developed by an analog-to-digital converter 214 which receives the phase current magnitude signal developed by the current sensor 86 (FIG. 5). The analog-to-digital converter 214 further provides the phase current magnitude signal to a low threshold current sensor 216 and a look-up table (LUT) 217 identical to the LUT 112 of FIG. 6.

As in the previous embodiment, the multiplexer 202 selects one of the three values associated with $V_{phase(forward)}$, $V_{phase(flyback)}$ or $V_{phase(flywheel)}$ on the basis of the logic state of the phase switches. In this embodiment, however, software is preferably implemented for the computation of the values, after which the values are then stored in first through third registers 218A–C, labeled INC, DEC1 and DEC2, respectively. As seen in FIG. 8, each register 218 is labeled in accordance with whether the value will lead to an increment (INC) or decrement (DEC) of the sum calculated by the accumulator 200. Thus, for example, $V_{phase(flyback)}$ is approximately equal to $-V_{bus}$ for high voltage applications, and, therefore, constitutes a decrement DEC1 to the sum in the accumulator 200.

Figure 9:
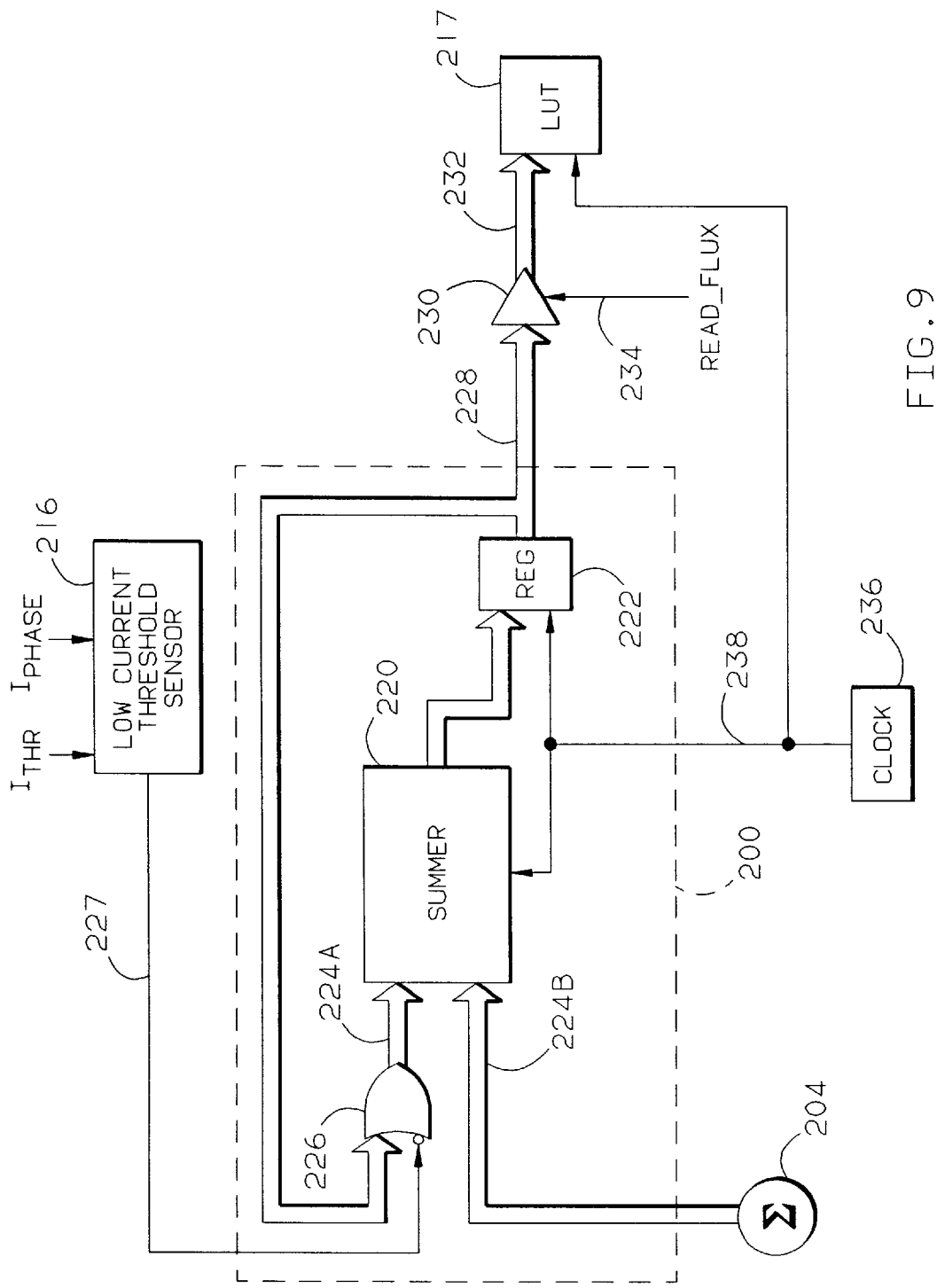
FIG. 9 comprises a block diagram of a portion of the digital flux integrator of FIG. 8 shown in greater detail together with a clock and a digital look-up table.

As seen in greater detail in FIG. 9, the accumulator 200 includes a summer 220 having an output bus coupled to a register 222. The summer 220 is preferably sufficiently large so that a precise representation of the phase flux linkage Ψ may provided by a number of upper order bits of the summer 220.

The summer 220 further includes first and second inputs coupled to first and second input buses 224A, 224B, respectively. Output lines of an n-bit wide AND gate 226 are coupled to the first inputs via the first input bus 224A, while outputs of the adder 204 are coupled to the second input terminal via the second input bus 224B.

The AND gate 226 has an inverting input coupled to the low current threshold sensor 126 via a line 227 and a set of non-inverting inputs coupled to an output bus 228 of the accumulator 200. The AND gate 226 feeds back the value appearing at the output of the accumulator 200 to the first inputs of the summer 220 via the first input bus 224A as long as the low current threshold sensor 216 provides a low signal on the line 227 to the inverting input of the AND gate 226. When the sensor 216 provides a high signal on the line 227, the output of the AND gate 226 comprises a plurality of zeroes which are provided to the first inputs of the summer 220 over the bus 224A, and hence the summer 220 is reset to the value appearing on the bus 224B. The AND gate 226 may be implemented using appropriate hardware and/or software, for example, by the DSP noted above.

The output of the accumulator 200 is provided via the output bus 228 to a tri-state buffer 230. The tri-state buffer 230, in turn, provides the output signal of the accumulator 200 on an output bus 232 to the LUT 217 upon receipt of a clocking signal READ_FLUX on a line 234. As in the previous embodiment, the signal on the output bus 232 constitutes a representation of the magnitude of the flux linkage for phase A and, together with the phase current magnitude signal, are used to address the LUT 217 to obtain a value representative of the estimated instantaneous rotor angle for phase A.

With continued reference to FIG. 9, a clock 236 provides clock pulses on a line 238 to the accumulator 200 to synchronize and control the summer 220 and the register 222. It should be noted that the frequency of the clock 236 should greatly exceed the frequency associated with the rotor speed to thereby add more precision to the phase flux linkage calculation.

Figure 10:
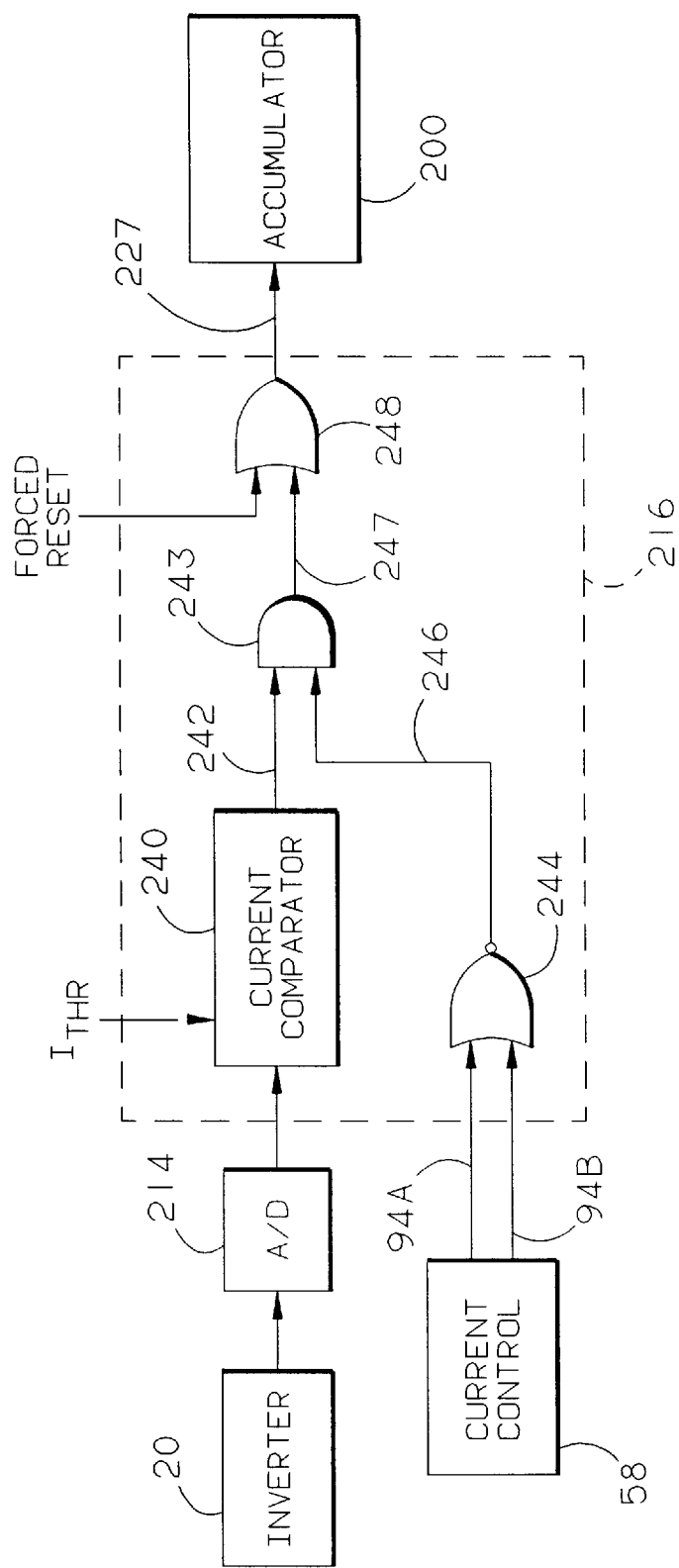
FIG. 10 comprises a block diagram of a low threshold current sensor together with the portion of the digital flux integrator of FIG. 9.

As seen in greater detail in FIG. 10, the low threshold current sensor 216 includes a digital current comparator 240 that compares the digital phase current magnitude signal provided by the analog-to-digital converter 214 to the predetermined reference value $I_{THR}$. The digital current comparator 240, which may be an analog comparator if the phase current magnitude signal is received directly from the sensor 86, develops a digital output signal on a line 242 which is coupled to an AND gate 243. A NOR gate 244 receives the first and second switch command signals on the lines 94A and 94B from the current control 58 and provides an output signal on a line 246 to the AND gate 243. The AND gate 243, in turn, provides a signal on a line 247 to an OR gate 248 having an output coupled by the line 227 to the inverting input terminal of the n-bit wide AND gate 226 in the accumulator 200. Again, the accumulator 200 can be reset by a forced reset signal developed by the DSP.

Figure 11:
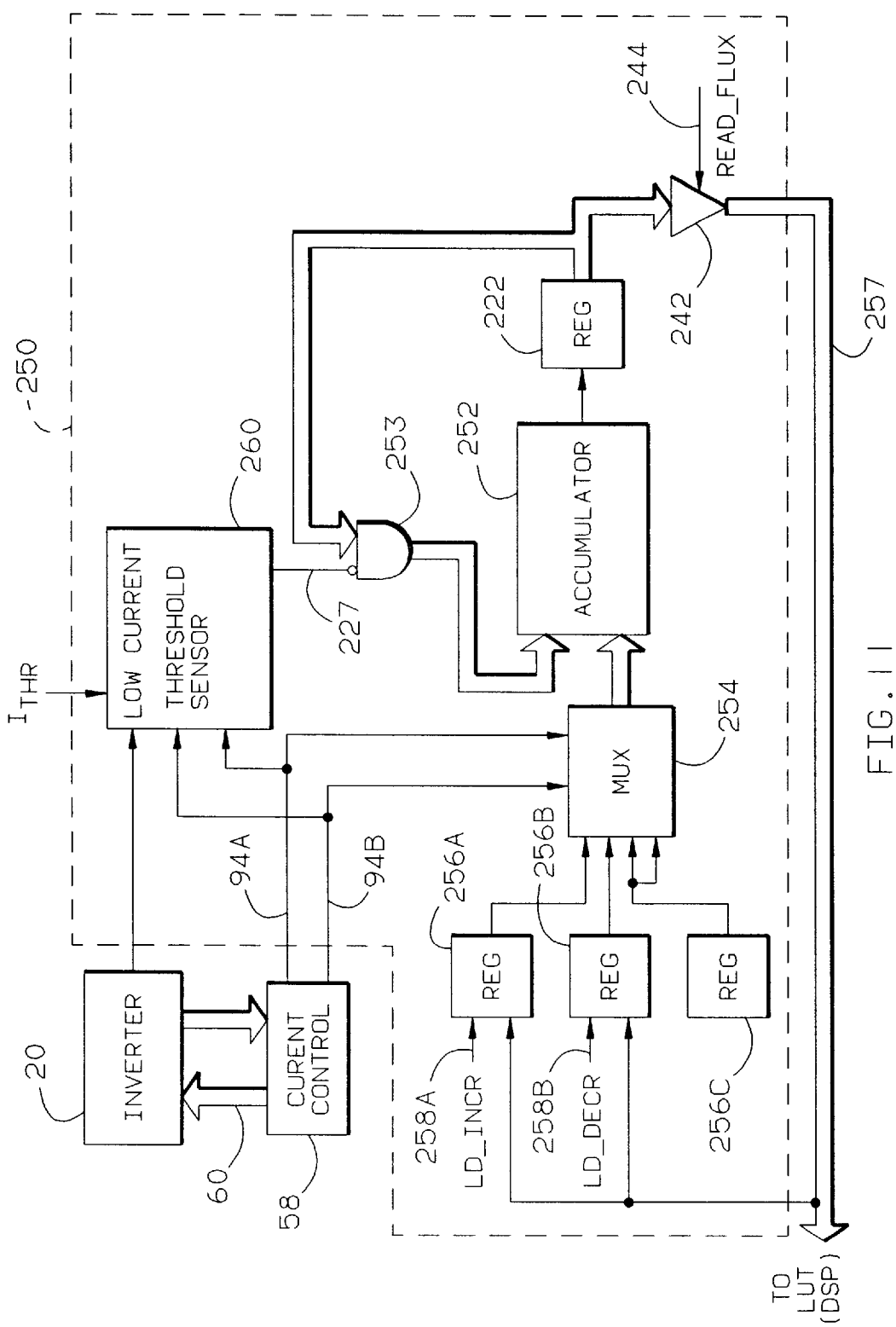
FIG. 11 comprises a block diagram of a digital flux integrator according to yet another embodiment of the present invention.

As seen in FIG. 11, yet another embodiment of the present invention for applications having a high DC bus voltage, e.g., 270 volts, includes a digital flux integrator 250 having reduced complexity due to further estimations in the calculation of the phase voltage. In such applications, the bus voltage term $V_{bus}$ dominates the phase voltage equations defined hereinabove such that the I*R terms involving the resistances of the feeder line $R_{feeder}$, the inverter switches $R_{switch}$ and the inverter diodes $R_{diode}$ are rendered negligible, as are the $V_{diode}$ and $V_{switch}$ terms. Still further, the $I_{phase} R_{phase}$ term in the flux linkage equation may also be neglected. Accordingly, the forward conduction condition increment rate, the flyback condition decrement rate and the flywheel condition decrement rate become $V_{bus}$, $-V_{bus}$ and zero, respectively.

The digital flux integrator 250 includes an accumulator 252 having a first input terminal coupled to an n-bit wide AND gate 253 (identical to the AND gate 226) and a second input terminal coupled to a multiplexer 254, which, in turn, receives signals from first through third registers 256A–256C. However, in consideration of the above approximations, the register 256C may provide logic zero states to represent an estimated $V_{phase(flywheel)}$ voltage of zero.

The registers 256A and 256B are preferably coupled to a data bus 257 from which the respective phase voltage estimate $V_{phase(forward)}$ or $V_{phase(flyback)}$ is retrieved upon receipt from the DSP of a first load signal LD__INCR on a line 258A or a second load signal LD__DECR on a line 258B, respectively. The same data bus 257 also provides an output of the digital flux integrator 250 to the LUT 217.

As in the previous embodiment, a low current threshold sensor 260 similar to the sensor 216 provides a signal to an inverting input of the n-bit wide AND gate 253. As in the previous embodiment, the low current threshold sensor 260 may include an analog comparator if it obtains the analog representation of the phase current directly from the current sensor 86, as shown, rather than requiring an intermediate analog-to-digital conversion.

The digital flux integrator 250 otherwise operates in the exact same manner as the previous digital embodiment of the present invention. Further elements found in FIG. 11 common to other figures are assigned like reference numerals.

It should be noted that, rather than approximating in the above fashion, the phase current can alternatively be estimated as a constant from a commanded current chopping level. The commanded current chopping level is developed by the control and protection circuit 54 in controlling commutation. Accordingly, the phase voltage equations can be calculated without requiring multiplication, and, thus, can be easily performed. The increment and decrement rates can likewise be pre-adjusted to incorporate the $I_{phase}R_{phase}$ term in the flux linkage equation, thereby completely eliminating the need for the multiplier 210 of FIG. 8.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An apparatus for estimating rotor position of a switched reluctance machine having a plurality of phases, each phase being in one of a plurality of logic states and having a phase winding across which a phase voltage is developed and through which a phase current flows, the phase current flowing through a resistance and the resistance being determined by the logic state of the phases comprising:

first means for developing an estimate of phase voltage magnitude in accordance with the resistance associated with the logic state of the phase, the first developing means including a second means for developing a scaled magnitude of the phase current; and means responsive to the first and second developing means for developing an estimate of rotor position.

2. The apparatus of claim 1, wherein the second developing means is responsive to a current sensor which detects phase current magnitude.

3. The apparatus of claim 1, wherein the second developing means utilizes a constant value to obtain an estimate of phase current magnitude.

4. The apparatus of claim 1, wherein the rotor position estimate developing means includes an integrator for computing a flux linkage magnitude for the phase winding and further includes means for initializing the integrator.

5. The apparatus of claim 4, wherein the initializing means initializes the integrator when both the phase is in a flyback conduction logic state and a magnitude of the phase current is less than a predetermined value.

6. The apparatus of claim 4, wherein the integrator develops an analog representation of the flux linkage magnitude.

7. The apparatus of claim 4, wherein the integrator comprises a digital accumulator for developing a digital representation of the flux linkage magnitude.

8. The apparatus of claim 4, further including a look-up table storing values representing rotor position.

9. In a switched reluctance machine having a plurality of phases, each phase being in one of a plurality of logic states and having a phase winding across which a phase voltage is developed and through which a phase current flows, the phase current flowing through a resistance and the resistance being determined by the logic state of the phase, an apparatus for estimating rotor position, comprising:

a current controller capable of developing a plurality of conduction signals for controlling the phase current wherein the conduction signals are determinative of the logic state of the phase;

developing means responsive to the plurality of conduction signals for developing an estimate of the magnitude of the phase voltage in accordance with the resistance associated with the logic state of the phase and for developing a scaled magnitude of the phase current; and an accumulator responsive to the developing means for computing a digital representation of a flux linkage magnitude to obtain an estimate of rotor position.

10. In a switched reluctance machine having a plurality of phases and a DC bus voltage having a high DC voltage wherein each phase is in one of a plurality of logic states and includes a phase winding across which a phase voltage is developed and through which a phase current flows, the phase current flowing through a resistance and the resistance being determined by the logic state of the phase, an apparatus for estimating rotor position, comprising:

means for estimating a magnitude of the phase voltage according to the DC voltage and the resistance of the phase associated with the logic state thereof; and means for integrating the magnitude of the phase voltage to obtain an estimate of rotor position.

* * * * *